United States Patent [19]

Roley

[11] 4,185,391
[45] Jan. 29, 1980

[54] SPROCKET WEAR TEMPLATE
[75] Inventor: Robert D. Roley, Peoria, Ill.
[73] Assignee: Caterpillar Tractor Co., Peoria, Ill.
[21] Appl. No.: 745,742
[22] Filed: Nov. 29, 1976
[51] Int. Cl.² .............................................. G01B 3/30
[52] U.S. Cl. ................................ 33/168 R; 33/169 B; 33/179.5 R
[58] Field of Search ............ 33/168 R, 147 M, 199 R, 33/179.5 R, 179.5 A, 179.5 E, 143 R, 169 B, 168 B, 169 C

[56] References Cited
U.S. PATENT DOCUMENTS 2,731,730  1/1956  Kraushaar ........................ 33/168 R
3,193,936  7/1965  Schnitzer ........................ 33/168 R Primary Examiner—Willis Little
Attorney, Agent, or Firm—Phillips, Moore, Weissenberger, Lempio & Majestic

[57] ABSTRACT

Apparatus for gauging the wear of a toothed sprocket includes a flat body defining a plurality of peaks about the periphery thereof. A pair of such peaks are brought into contact with adjacent flanks of adjacent teeth of the sprocket, and another peak, intermediate the pair of peaks, is brought adjacent the root area of the sprocket between such adjacent flanks, so that wear of a sprocket in such area can be observed.

9 Claims, 3 Drawing Figures

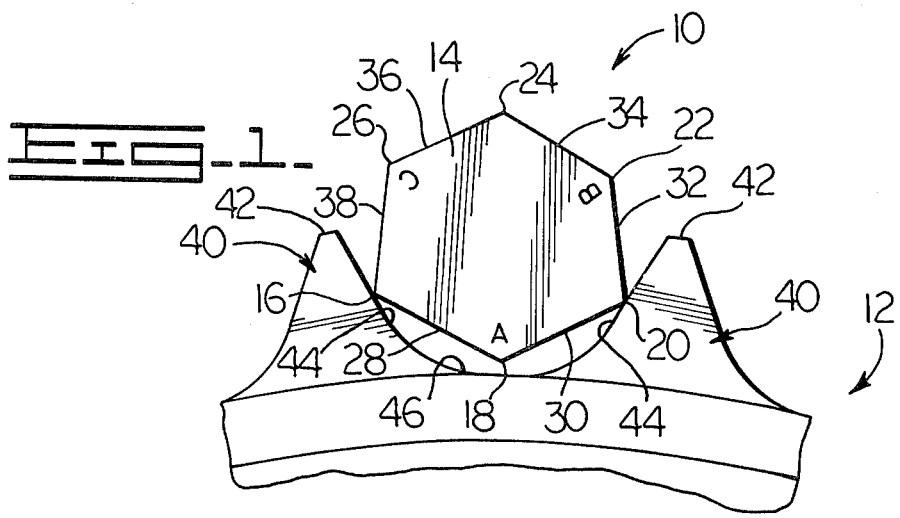
FIG_1_
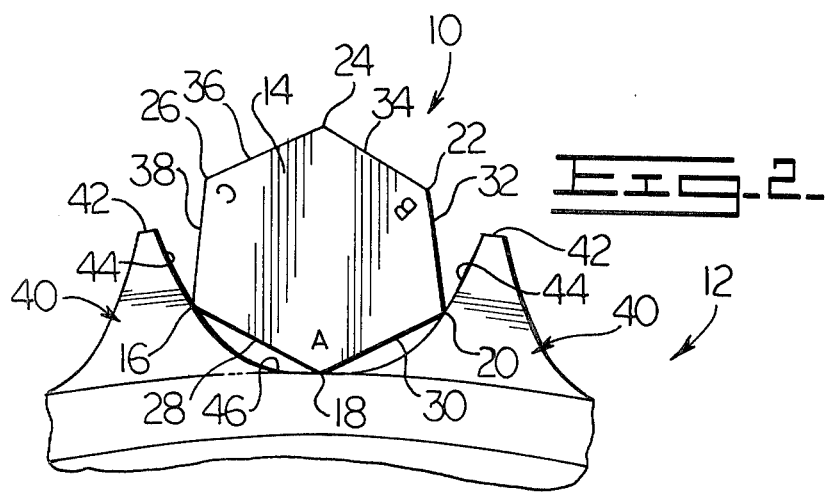
FIG_2_
FIG_3_
PRIOR ART
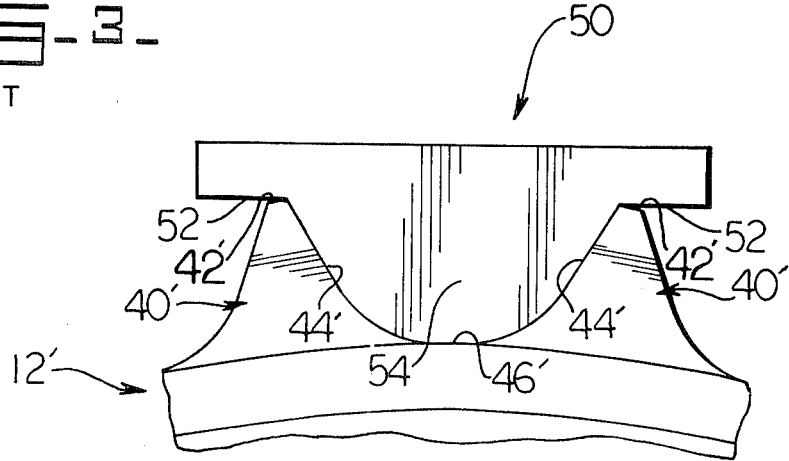

SPROCKET WEAR TEMPLATE

BACKGROUND OF THE INVENTION

This invention relates to gauge apparatus, and more particularly to an apparatus for gauging the wear of a sprocket.

In general, it is well-known to provide a gauge in the form of a template for attempting to determine the extent of wear of the tooth area of the sprocket. In general, such a template includes a protruding portion the outer surface of which is sized and configured to conform with the sprocket surface connecting adjacent tooth tips (with such sprocket surface in a worn state). Such a template also generally defines extending surfaces which contact the adjacent tooth tips with the protruding portion so positioned. In the use of this device, in theory, as the sprocket surface between such adjacent tooth tips wears, a gap will be seen between the protruding portion and such sprocket surface connecting the adjacent teeth, with the extended portions still in contact with the tooth tips of the sprocket. The problem encountered in the use of such an apparatus is that the tooth tips themselves wear to an extent over a period of time, so that the protruding portion of the template will extend further in the recess between the tooth tips than if such tip wear did not take place, resulting in a misreading of the actual extent of wear of sprocket.

SUMMARY OF THE INVENTION

It is accordingly an object of this invention to provide apparatus for gauging the wear of a toothed sprocket, wherein adjacent flanks of adjacent teeth of the sprocket are used as reference points for measuring the wear, rather than tips of adjacent teeth.

It is a further object of this invention to provide apparatus which, while fulfilling the above object, is highly effective in use, meanwhile being extremely simple in design and manufacture.

Broadly stated, the invention comprises apparatus for gauging the wear of a toothed sprocket, the apparatus comprising a body defining first, second and third spaced peaks on the outer surface thereof, positioned (i) so that with such a sprocket in a relatively less worn state, the first and third peaks may be brought into contact with adjacent flanks of adjacent teeth of sprocket with the second peak positioned in the root area of the sprocket between the adjacent flanks, but with the second peak removed from contact with the sprocket, and (ii) so that with such a sprocket upon which sufficient wear has taken place, the first and third peaks may be brought into contact with the adjacent flanks of adjacent teeth of such a sprocket, bringing the second peak into contact with the sprocket in the root area of the sprocket between the adjacent flanks.

BRIEF DESCRIPTION OF THE DRAWINGS

These and other objects of the invention will become apparent from a study of the following specification and the drawings, in which:

FIG. 1 is a side elevation of the apparatus measuring the wear of a relatively unworn sprocket;

FIG. 2 is a view similar to that shown in FIG. 1, but with the sprocket having undergone a certain degree of wear;

FIG. 3 is a view of a prior art apparatus in use.

DESCRIPTION OF THE PREFERRED EMBODIMENT

Shown in FIGS. 1 and 2 is the present apparatus 10 for gauging the wear of a toothed sprocket 12. Such apparatus 10 includes a body 14 which is generally flat in configuration, and which may be made of plastic or some similar material. Such body 14 may, for example, be about $\frac{1}{8}$" thick. The body 14 define first, second, third, fourth, fifth and sixth spaced peaks 16,18,20,22,24,26 in series on the outer periphery thereof, each of the peaks lying generally in the plane of the body 14. Each pair of adjacent peaks is connected by a substantially straight outer peripheral body portion, as at 28,30,32,34,36,38.

The apparatus 10 is used to gauge the wear of a toothed sprocket 12 of conventional design, including a plurality of spaced teeth 40, each of which define a tooth tip 42. Connecting the tips 42 of adjacent teeth 40 are adjacent flanks 44, and a root area 46. During operation of such a sprocket 12, bushings of a track of the vehicle seat in and contact such flanks 44 and root area 46 and provide wear thereof over a period of operation of the vehicle.

The body 14 defines indicia means in the form of letters A, B and C thereon, indicating the second, fourth and sixth peaks 18,22,26 thereof respectively. In the measuring of the wear of a sprocket 12 which may be of a certain configuration denoted for our purposes as type A, the second peak is initially pointed generally toward the center of that sprocket 12 and the pair of peaks 16,20 are brought into contact with the adjacent flanks 44 of the adjacent teeth 40 of the sprocket 12, such positioning of the body 14 bringing the peak 18 adjacent the root area 46 of the sprocket 12. In a relatively less worn sprocket 12 as shown in FIG. 1, the peak 18 is removed from contact with the sprocket 12, indicating such relatively less worn state of the sprocket 12.

Upon sufficient wear of such type A sprocket having taken place, the apparatus 10 is used in an identical manner, with the peaks 16,20 being brought into contact with the adjacent flanks 44 of the adjacent teeth 40 of such a type A sprocket. It will be seen, however, in FIG. 2, that the peak 18 is now in contact with the sprocket 12 in the root area 46 between the adjacent flanks 44. It will thus be clearly indicated to the user of the apparatus 10 that the sprocket 12 is in a worn state.

As noted above, the peaks 16,18,26 are positioned such that an appropriate reading will be given on a sprocket 12 of a type A configuration, it of course being necessary, as set forth above, to point the peak 18 indicated with the indicia marking A generally toward the center of such type A sprocket during the use thereof. Assuming that the sprocket 12 is of a configuration which may be denoted for our purposes as type B, the apparatus 10 may be turned so that the peak 22 indicated as B points generally toward the center of such type B sprocket, the peaks 20,24 being positioned so that a proper wear reading of the type B sprocket will take place in a manner similar to the above. That is, the peaks 20,24 will be brought into contact with the adjacent flanks 44 of the adjacent teeth 40 of the sprocket 12, and the wear will be noted by observing the position of the peak 22 in relation to the root area 46.

Similarly, yet another configuration of sprocket can be measured for wear by pointing the peak marked as C generally toward the center of a so configured and sized sprocket denoted as a C-type sprocket.

It should also be understood that, for example, yet another sized and configured sprocket can be measured for wear by generally pointing any of the peaks 16,20,24 toward the center of an appropriate sprocket, with the pair of peaks flanking that peak in contact with adjacent flanks of adjacent teeth.

It is to be noted that in the present apparatus there is no part of such apparatus which is in contact with the tips 42 of any teeth 40 of the sprocket 12 being measured for wear, i.e., the tooth tips 42 are not used as reference points during the measurement of such wear. This can be compared to the FIG. 3 apparatus 50 wherein extended portions 52 of the template are in contact with the tooth tips 42', with a protruding portion 54 engaging the flanks 44' and root area 46' between adjacent teeth 40'. As the flanks 44' and root area 46' wear, and the tooth tips 42' wear, it will be seen that the apparatus 50 of FIG. 3 would not indicate that the sprocket 12' has worn to the extent that it actually has, since the worn tooth tips 42' will allow the protruding portion 54 to seat further into the root area 46' than it should. The present apparatus uses adjacent flanks 44 of adjacent teeth 40 as reference points, rather than tooth tips 42, and the peaks thereof are appropriately positioned to give an accurate reading of wear of the sprocket 12.

What is claimed is:

1. Apparatus for gauging the wear of a toothed sprocket, said apparatus comprising a body defining first, second and third spaced peaks on the outer surface thereof, said apparatus being positioned so that with such a sprocket in a relatively less worn state, the first and third peaks may be brought into contact with adjacent flanks of adjacent teeth of a sprocket with the second peak positioned in the root area of the sprocket between the adjacent flanks, but with the second peak removed from contact with the sprocket, and with such a sprocket upon which sufficient wear has taken place, the first and third peaks may be brought into contact with the adjacent flanks of adjacent teeth of such a sprocket, bringing the second peak into contact with the sprocket in the root area of the sprocket between the adjacent flanks, and wherein the body further defines a fourth peak on the outer surface thereof, spaced from the first, second and third peaks, said apparatus being positioned so that with another differently sized toothed sprocket in a relatively less worn state, the second and fourth peaks may be brought into contact with adjacent flanks of adjacent teeth of such differently sized sprocket with the third peak positioned in the root area of the differently sized sprocket between the adjacent flanks thereof, but with the third peak removed from contact with such differently sized sprocket, and with such a differently sized sprocket upon which sufficient wear has taken place, the second and fourth peaks may be brought into contact with adjacent flanks of adjacent teeth of such differently sized sprocket, bringing the third peak into contact with the differently sized sprocket in the root area thereof between the adjacent flanks thereof.

2. The apparatus of claim 1 wherein the body is generally flat in configuration, and wherein each of the first, second and third peaks is defined on the outer periphery of the body, each of the first, second and third peaks lying generally in the plane of the body.

3. The apparatus of claim 2 wherein the first and second peaks are connected by a substantially straight outer peripheral portion of the body, and wherein the second and third peaks are connected by a substantially straight outer peripheral portion of the body.

4. The apparatus of claim 1 wherein the body further defines a fifth peak on the outer surface thereof and spaced from the first, second, third and fourth peaks, said apparatus being positioned so that with still another differently sized toothed sprocket in a relatively less worn state, the third and fifth peaks may be brought into contact with adjacent teeth of such still another differently sized sprocket with the fourth peak positioned in the root area of the still another differently sized sprocket between the adjacent flanks thereof, but with the fourth peak removed from contact with such still another differently sized sprocket, and with such still another differently sized sprocket upon which sufficient wear has taken place, the third and fifth peaks may be brought into contact with the adjacent flanks of adjacent teeth of such still another differently sized sprocket, bringing the fourth peak into contact with the still another differently sized sprocket in the root area thereof between the adjacent flanks thereof.

5. The apparatus of claim 4 wherein the body further defines a sixth peak on the outer surface thereof, spaced from the first, second, third, fourth and fifth peaks, said apparatus being positioned so that with yet another, differently sized toothed sprocket in a relatively less worn state, the fifth and first peaks may be brought into contact with adjacent flanks of adjacent teeth of such yet another differently sized sprocket with the sixth peak positioned in the root area of the yet another differently sized sprocket between the adjacent flanks thereof, but with the sixth peak removed from contact with such yet another differently sized sprocket, and with such yet another differently sized sprocket upon which sufficient wear has taken place, the fifth and first peaks may be brought into contact with adjacent flanks of adjacent teeth of such yet another differently sized sprocket, bringing the sixth peak into contact with the yet another differently sized sprocket in the root area thereof between the adjacent flanks thereof.

6. The apparatus of claim 5 wherein the body is generally flat in configuration, and wherein each of the first, second, third, fourth, fifth and sixth peaks is defined on the outer periphery of the body, each peak lying generally in the plane of the body.

7. The apparatus of claim 6 wherein each pair of adjacent peaks is connected by a substantially straight outer peripheral portion of the body.

8. The apparatus of claim 5 wherein the body defines indicia means indicating the second, fourth and sixth peaks thereof.

9. The apparatus of claim 7 wherein the body defines indicia means indicating the second fourth and sixth peaks thereof.

* * * * *